Figure 1:
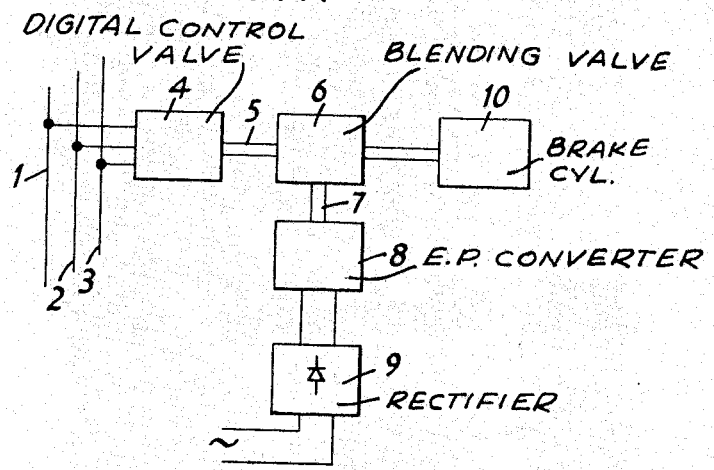

United States Patent [19]

Maskery

[11] 3,868,150

[45] Feb. 25, 1975

[54] BRAKE CONTROL APPARATUS FOR A BLENDING BRAKING SYSTEM TO REDUCE EFFECTS OF RELATIVE BRAKING RESPONSE TIMES

[75] Inventor: Arthur Maskery, London, England

[73] Assignee: Westinghouse Brake & Signal Company Limited, London, England

[22] Filed: June 11, 1973

[21] Appl. No.: 368,727

[30] Foreign Application Priority Data
June 21, 1972 Great Britain .................... 29177/72
Sept. 21, 1972 Great Britain .................... 43743/72

[52] U.S. Cl. .................................... 303/20, 303/3
[51] Int. Cl. ........................................... B60t 13/74
[58] Field of Search .............. 188/3 R; 303/3, 7, 20

[56] References Cited
UNITED STATES PATENTS

| | | | |
|---|---|---|---|
| 3,398,993 | 8/1968 | Sarbach et al. .................... | 303/20 |
| 3,402,972 | 9/1968 | Cooper et al. .................... | 303/20 |
| 3,507,542 | 4/1970 | Cannella .......................... | 188/3 R X |
| 3,547,499 | 12/1970 | Maskery ........................... | 303/20 X |
| 3,747,992 | 7/1973 | Schnipke .......................... | 303/7 X |

*Primary Examiner*—Trygve M. Blix
*Assistant Examiner*—Stephen G. Kunin
*Attorney, Agent, or Firm*—Larson, Taylor & Hinds

[57] ABSTRACT

Braking control apparatus for controlling a blend of electropneumatic braking and dynamic braking in response to a braking command signal is responsive to a signal indicative of the degree of electric braking for producing a control signal for the electropneumatic braking apparatus to cause it to supplement the electric braking to give braking as called for by the command signal and the apparatus being responsive to a changing electric braking effect for causing the control signal for the electropneumatic brake to change in an exaggerated manner to reduce the effects of relative time delays in the effectiveness of the electric braking and the electropneumatic braking in response to the command signal.

4 Claims, 5 Drawing Figures

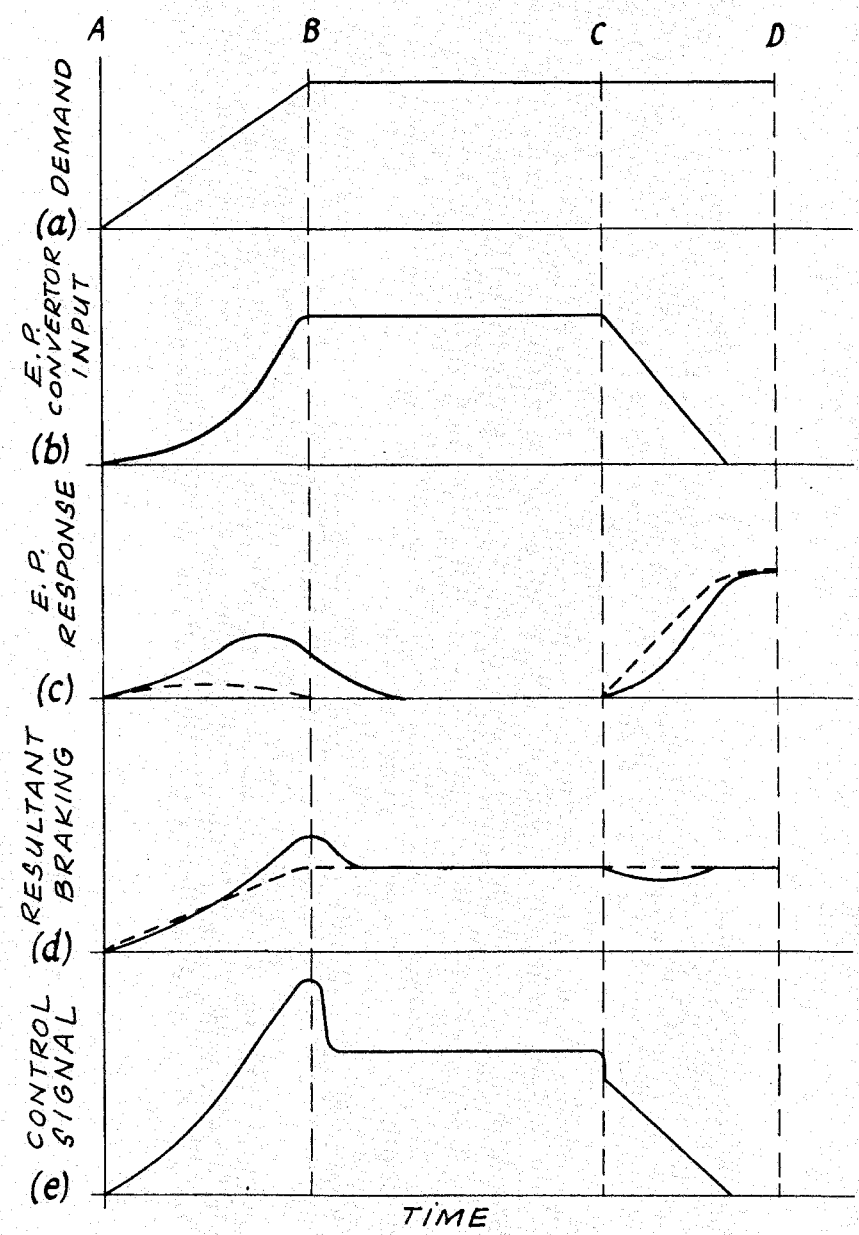

BRAKE CONTROL APPARATUS FOR A BLENDING BRAKING SYSTEM TO REDUCE EFFECTS OF RELATIVE BRAKING RESPONSE TIMES

This invention relates to braking control apparatus and relates particularly to apparatus for controlling in response to a braking command signal and a signal indicative of a degree of electric braking being effective, to provide a control signal for controlling additional braking means.

It has hitherto been proposed to provide braking systems especially for railway use where electric traction motors are employed, which utilise for braking a blend of electropneumatic and dynamic braking. In such a system, it is usual to employ a blending valve or other means which is responsive to a braking command signal and a signal indicative of the degree of dynamic braking to produce a control signal for controlling the electropneumatic brake to make up any deficiency between the braking produced by the dynamic brake and the braking called for by the command signal.

According to the present invention there is provided a braking control apparatus including blending means responsive to a braking command signal and a signal indicative of electric braking for producing a control signal for additional braking means for causing the additional braking means to make up deficiency between the electric braking and the braking called for by the command signal and the apparatus also including means responsive to a signal indicative of a changing electric braking effect for causing said control signal to change by an amount appropriate to a greater change of electric braking.

The invention can enable undesirable effects due to disparity between the response time delays which exist in electric braking (more especially dynamic braking) and pneumatic braking means, to be reduced.

Preferably, the means which is responsive to the said signal indicative of the changing dynamic brake effect comprises an electrical circuit the supply to which is derived exclusively from the said signal in such a manner that it cannot cause the apparatus to fail to other than a safe condition.

Figure 3:
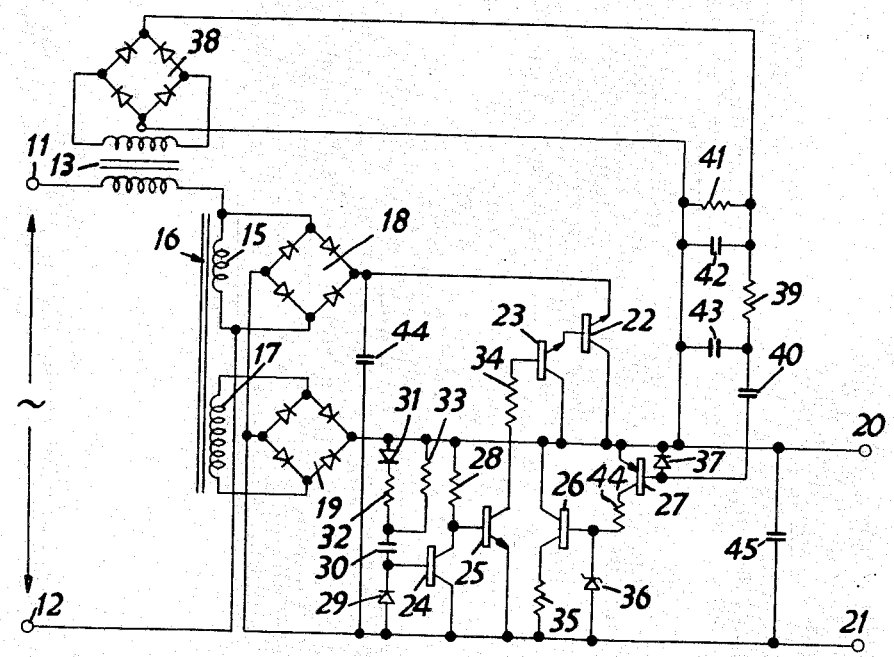
Figure 4:
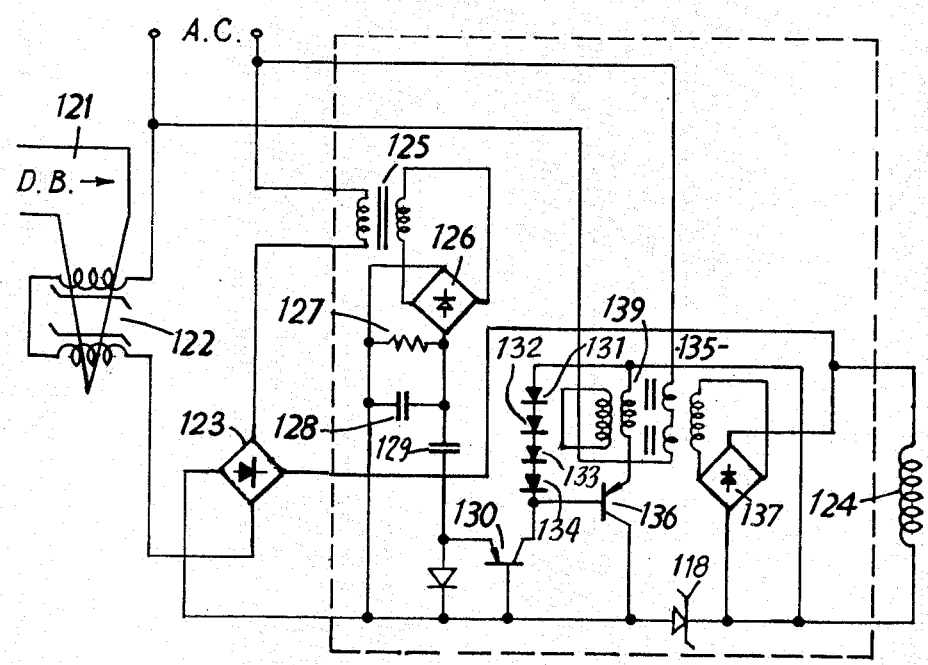
Figure 5:
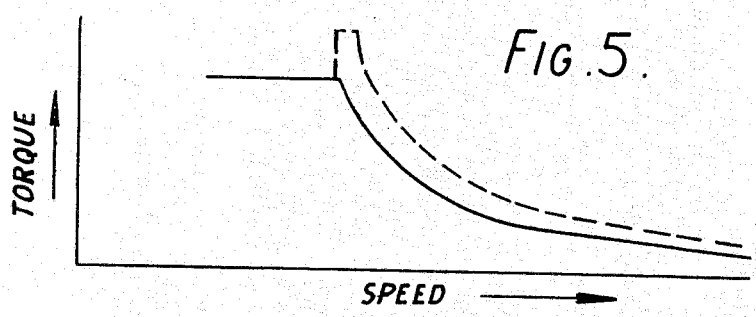

In order that the invention may be more clearly understood and readily carried into effect, the same will be further described by way of example with reference to the accompanying drawings of which:

FIG. 1 illustrates in simplified block form a typical form of braking control apparatus to which the invention may be applied, FIG. 2 illustrates graphically the effects to be experienced with and without the invention being employed, FIG. 3 illustrates a circuit for use in apparatus of the type described with reference to FIG. 1 and employing the invention, FIG. 4 illustrates an alternative form of circuit, and FIG. 5 illustrates a dynamic braking signal curve to be referred to in connection with FIG. 4.

The parts of the braking system shown in the respective circuit drawings are for incorporating in railway braking equipment of the type including an electric braking system in the form of a dynamic braking system and an electropneumatic braking system. Such equipment is, of itself, well-known and a typical such system is the so-called "Westcode" (Registered Trade Mark) braking equipment described, for example, in Appendix 8 of "An Introduction to Railway Braking" by H. R. Broadbent and in more detail in the Paper entitled "Combined Air and Dynamic Braking Systems for Railway Vehicles, Particularly the New Lightweight Cars for the Toronto Transit Commision" by Dr. I. G. Moore presented before the Institution of Locomotive Engineers on the 16th of December, 1963 and published in that Institution's Journal as Paper number 651.

In view of the disclosure in these documents of this now well-known type of braking equipment, only a very general description of this equipment is required in this Specification.

So far as the present invention is concerned, the Westcode equipment includes an electro-pneumatic system controlled by the selective energisation in various combinations of wires which pass the length of the train and which, on each vehicle of the train, energise the selected combination of electro-magnetic valves the pneumatic outputs of which are applied to a plurality of various-sized diaphragms to operate a self-lapping valve to produce therefrom a pneumatic pressure output which is applied to the brake cylinder of the vehicle to effect through the electropneumatic braking system a degree of braking determined by the combination of energisation of the wires.

The Westcode braking equipment is particularly of application of railway vehicles of high-density commuter systems and such vehicles frequently carry in addition to the mechanical brake controlled by the Westcode braking equipment, a dynamic brake.

The present apparatus is especially concerned with the problem of the discrepancy between the response times of the electric braking system and the electric braking systems in such braking systems in combination.

Referring to FIG. 1, this shows three train wires 1, 2 and 3 connected to digital control valve apparatus denoted by the block 4 an output demand pressure from which is applied via the conduit 5 to a blending valve denoted by the block 6. The blending valve also receives a further input via a conduit 7 from an electropneumatic converter denoted by the block 8. The converter is preferably of a type described in the copending patent application Ser. No. 224,057, now U.S. Pat. No. 3,799,498. This converter receives a d.c. control signal from a rectifier 9 having input terminals connected to receive an a.c. signal indicative of the degree of dynamic braking being effected by dynamic braking means on a vehicle which carries the apparatus. The output of the blending valve 6 is a control pressure for application to a proportional relay valve or directly to a brake cylinder denoted by reference 10. The wires 1, 2 and 3 are wires which are electrically continuous via inter-car couplers throughout the length of a train and braking apparatus such as shown in FIG. 1 is assumed to be provided on each car of the train. The wires 1, 2 and 3 carry selective electrical energisation to provide a digital coded input to the digital control apparatus represented by block form. These codes represent seven spaced values of retardation to be called for by the driver or a retardation controller provided on the train. In practice the blending valve or the digital control valve apparatus of block 4 is normally provided with load-weighing means for modifying the output of the apparatus in accordance with the weight of the vehicle but the load weighing means as such comprises no part of the present invention.

In operation of the arrangement of FIG. 1, the digital signals appearing on lines 1, 2 and 3 are converted into an output pneumatic pressure in the conduit 5 which is suitably proportioned for the pressure generated by the electropneumatic converter 8 to be in opposition therewith in the blending valve 6. The output control pressure or braking pressure derived from 6 is therefore a braking control pressure signal which is representative of braking force required to achieve the demand retardation with the amount of dynamic braking which is being produced subtracted from it. Accordingly, the braking effected by the pneumatic braking is such as to make up any deficiency in the dynamic braking as compared with the demanded braking. Referring to FIG. 2, a typical braking demand is represented at the curve (a). In the curve (a) it is seen that an approximately linear rise of braking demand is initially produced in the region AB. This region may be regarded as the jerk-control region and restricts the rate at which braking can be called for regardless of how rapidly the driver operates the brake handle for example. The region BD, is a steady retardation region required to be maintained until the vehicle comes to rest. It will be appreciated that in practice the dynamic braking declines very markedly towards the end of a vehicle stopping operation and therefore over the region CD, the braking is predominately effected by the electropneumatic braking. For this reason, the electropneumatic braking, which in the present example is the additional braking means, is far more than a standby brake for taking over merely in the event of dynamic brake failure. The curve (b) represents the d.c. signal which appears at the input to the electropneumatic converter 8 of FIG. 1. This signal indicates the amount of dynamic braking being produced at any instant and the pressure signal appearing at the second input to the blending valve 6, is therefore subtracted from the demand signal at 5 to produce the desired output braking signal for the electropneumatic braking provided by 10.

Since the response time constants for the dynamic brake control and the electropneumatic brake control are not identical, the time constant associated with the pneumatic brake control being substantially longer than that for the dynamic brake control, without the invention the electropneumatic braking responds in a manner shown in the solid curve (c) of FIG. 2. It is observed that in this example the dynamic brake is delayed before responding to the demand. The electropneumatic brake tends to supplement to demand during the delay, but is unable to respond at a sufficiently fast rate to remove the supplementation when the dynamic brake application rate increases as it approaches point B. The electropneumatic supplementation is still therefore present when the dynamic brake has reached the demanded level at point B. This gives rise to a resultant braking surge as shown around the point B in solid curve (d) which represents the sum of the dynamic brake and electropneumatic brake produced by the apparatus in response to the demanded braking signal of curve (a).

Again, when the dynamic braking begins to decline towards the end of the braking curve, the electropneumatic brake responds to the curve in the region of CD somewhat after the point C and therefore a depression appears subsequent to the point C in the resultant solid braking curve (d).

The circuit arrangement to be described seeks to reduce the above effects due to the response time constant discrepencies in the apparatus and reference will now be made to FIG. 3.

The circuit arrangement of FIG. 3 has two input terminals 11 and 12 connected via a winding of a current transformer denoted by the reference 13 to a winding 15 of a transformer having a core 16. The transformer has a further winding 17 the number of turns on which is approximately half the number of turns on the winding 15 and the windings 15 and 17 are connected to respective bridge rectifiers 18 and 19. The d.c. output of the latter bridge rectifier is connected to the "positive" and "negative" rails of a transistor circuit and to current output terminals 20 and 21. The d.c. output of the bridge rectifier 18 has one terminal connected in common with the corresponding terminal of the bridge 19 and the other d.c. terminal of 18, being the positive terminal is connected via the emitter collector path of a transistor 22 of a Darlington pair comprising transistors 22 and 23, to the aforementioned rail which is connected to the terminal 20. The previously mentioned transistor circuit comprises transistors 24, 25, 26 and 27 and the various associated components. The transistor 24 has a collector resistor 28 and the base electrode of 24 is connected to the junction between a diode 29, and a capacitor 30 which are in series with a further diode 31 and a resistor 32, a further resistor 33 being connected across 31 and 32 as shown. The base electrode of transistor 25 is connected to the collector of transistor 24 and the collector electrode of transistor 25 is connected via a resistor 34 to the base electrode of the above mentioned transistor 23. The transistor 26 has an emitter resistor 35 and the collector circuit of 26 lies between the aforementioned positive and negative rails, the base electrode being connected via a Zener diode 36 such that with 36 conducting, the transistor 26 is a constant current device. The base electrode of 26 is further connected via a resistor 44 to the collector path of the transistor 27 the emitter of which is connected to the aforementioned positive supply rail and terminal 20. Between the base electrode of 27 and this supply rail, there is a diode 37. The transformer 13 has a secondary winding which is connected to a further bridge rectifier 38 the positive output d.c. terminal of which is connected via a resistor 39 and a capacitor 40, to the base electrode of transistor 27. The negative d.c. output terminal of the bridge rectifier 38 is connected to the upper rail of the transistor circuit which is connected to the terminal 20. Across the d.c. output of 38 there is a resistor 41 and a capacitor 42 and a further capacitor 43 is connected between the junction of 39 and 40 and the negative d.c. terminal of the bridge 38.

In operation of the circuit arrangement of FIG. 3, this circuit is arranged to take the place of the rectifier 9 of FIG. 1. Accordingly, on the commencement of a.c. input at terminals 11 and 12, there is an indication that dynamic braking is commencing and the e.m.f. in the winding 17 is approximately half that in 15 of the transformer having core 16. The rectifier bridge 18 conducts initially to energise the transistors 22 and 23 to supply current to the E.P. converter 8 via terminals 20 and 21. The voltage produced by the bridge 18 thus charges the capacitor 30 and switches on the transistor 24 to then turn off transistors 25, 23 and 22. At this time, the current via terminals 20 and 21 changes and becomes equal to the input current via the terminals 11 and 12 divided by the turns ratio between windings 15 and 17. The current thus doubles.

A short time, determined by the time constant of items 30 and 32, after the commencement of charging current to 30, when the base current to transistor 24 ceases, this transistor turns off. Consequently the transistors 25, 23, 22 are again rendered conducting. The current supplied to the terminals 20 and 21 is therefore then reduced again by a half and continues to be determined by the current supplied via the terminals 11 and 12. Also during operation, the current transformer 13, produces a current which is rectified via the diode bridge 38 and charges the capacitor 42 proportionately to the input current, the resistor 41 being an appropriate burden on the current transformer. The capacitor 40 also charges to a similar voltage via the diode 37. Thus when the current between terminals 11 and 12 begins to reduce at the end of the dynamic braking phase when the vehicle speed has reduced, the capacitor 40 discharges via the base emitter diode of the transistor 27 resulting in the transistor 27 becoming conducting to render the transistor 26 conducting to carry a current the magnitude of which is determined by the limiting effect of the Zener diode 36. The transistor 26 therefore becomes at this time a constant current device and it is seen that at such an instant, that is when the dynamic brake current signal begins to decline, the conduction of transistor 26 causes a predetermined amount of current to be diverted from the output terminals 20 and 21.

It is thus observed that at the commencement of a dynamic braking cycle, when the dynamic braking signal is slowly increasing, the converter 8 is subjected to an amplified or boosted dynamic brake signal and this is so during such time as the dynamic brake is rising and also after the point B for a time determined by the resistor 32 and the capacitor 30. This amplification has the effect of boosting the signal in conduit 7 and therefore of holding back the rise of pneumatic brake for a time which is sufficient that when the dynamic brake actually being produced has attained the desired level as called for by the demand signal, the pneumatic brake has not attained a value which tends to exceed the desired amount due to the response time discrepancies and such as to cause the pneumatic brake surge at the commencement of the braking cycle. Conversely, when the steady dynamic braking interval between points B and C finishes, and the dynamic brake current signal applied at terminals 11 and 12 reduces, the current signal fed to the converter 8 via the terminals 20 and 21, is rapidly stepped downwards by a predetermined amount by virtue of the conduction of the transistor 26. This has the effect of causing the pneumatic brake to respond much more rapidly than it otherwise would to a steadily declining dynamic brake signal and therefore tends to "fill in" the deficiency in pneumatic brake which is otherwise produced at this time by virtue of the time of response thereof, which is long as compared with the dynamic brake response time. It will be appreciated further that by virtue of the arrangement shown, where the amount by which the dynamic brake signal applied to the converter 8 is decremented, including a Zener diode 36, the point is reached when the diode 36 no longer conducts, the current flowing in transistor 26 is no longer constant and therefore a progressively reducing amount of current is diverted from the terminals 20 and 21 towards the end of the reducing braking cycle called for by the demand signal of waveform (a).

For comparison between the waveforms, the modified dynamic brake current signal which appears between terminals 20 and 21, is shown in waveform (e) and the effect of utilising this waveform as compared with that of waveform (b) is illustrated by the dotted waveform shown against the solid waveform (c) which results in a modified and improved retardation waveform shown dotted against the waveform (d). It is seen that the undesirable peaks and dips in the resultant braking are removed or reduced.

In a typical dynamic brake system the braking current is controlled by a cam controller which makes the dynamic brake current change in a sawtooth fashion, being a combination of falling speed and resistor switching. It is sometimes desirable to ensure that the boost circuit should not operate when subjected to the sharp rise in dynamic brake which occurs when a smaller value of dynamic brake load resistance is selected by the cam controller. This facility is provided by discharging capacitor 30 via diode 29 and resistor 33. By virtue of the fact that the time constant C30 R33 is long and that resistor 33 is returned to the output terminal 20 rather than the common terminal 21, the discharge time of capacitor 30 is long compared to the stopping time. Thus at the commencement of braking when capacitor 30 has no charge the boost circuit is operative and capacitor 30 is charged to a voltage proportional to the boosted current, by virtue of the current passing through the E.P. converter 8 which developes a voltage across terminals 20 and 21. When the dynamic brake signal reaches a comparatively steady state condition after point B in waveform (e) the capacitor discharges at a slow rate via diode 29 and resistor 33. Transistor 24 is cut off by the discharge current passing through diode 29. In order to render the boost circuit operative again the voltage developed across terminals 20 and 21 must rise to a value in excess of the charge on capacitor 30. Since the capacitor is charged to approximately twice the steady state voltage during the commencement of the braking cycle and the discharge time is comparatively long, the steps produced by resistor switching which are normally small compared to the boosted voltage do not bring the boosting circuit into operation. During the periods between train stops the discharge time of capacitor 30 is effectively shorter by virtue of its aiming potential being zero rather than the signal voltage across terminals 20 and 21. Thus the discharge time is short compared to the time between stops and at the commencement of the next stop the charge on comparator 30 is substantially zero.

In another application of the present invention the means responsive to a signal indicative of changing electric braking to cause the control signal to change by an amount appropriate to a greater change of electric braking, may be effective to supplement the signal indicative of changing electric braking by an amount which increases with the said rate of change.

One form of circuit arrangement for achieving this is shown in FIG. 4. Use of this circuit is appropriate in circumstances when the electric brake is of a regenerative type, feeding power back to a traction system and the speed against torque characteristic is a rectangular hyperbola such as shown by the solid curve in FIG. 5. The rate of change of the torque signal is slow at high speeds and problems may be encountered caused by hysteresis in the pneumatic braking system. Such problems may be reduced by arranging to apply a small direct current incremental signal to the feed back signal to ensure that the moving parts of the pneumatic portion are in the correct position to handle a rising torque signal. At medium speeds moreover, the rate of change is high and one encounters problems due to the rise time of pressure in the pneumatic system. This may be dealt with by an incremental signal proportional to the rate of change and to give a resultant feedback signal as shown dotted in FIG. 5 which may ensure that self-lapping valves which are normally utilised in the pneumatic braking system are sufficiently opened to afford a maximum flow of air. Practical difficulties have been experienced in determining the area in which a simple step is required and that in which an effective phase advance is required. It has been found that a system which employs sufficient "phase advance" to overcome hysteresis on slowly changing signals is excessively sensitive with regard to fast signals. This difficulty may be overcome by employing a simple diode limiting circuit to limit the magnitude of the phase advanced signal and also to produce a feed back signal similar to the dotted curve shown in FIG. 5.

Referring to FIG. 4, that part of the circuit which is outside the dotted outline is a typical dynamic brake current monitoring circuit. The brake current is monitored on a bus bar 121 by means of a magnetic amplifier 122. The constant current output from 122 is rectified by a rectifier bridge 123 and fed into the coil of an electropneumatic converter control winding 124 connected to the output of the monitoring circuit. The signal phase advance circuit is shown inside the dotted outline and comprises current transformer 125, rectifier 126, a burden 127 for the rectifier and a smoothing capacitor 128. The voltage which appears across the capacitor 128 is proportional to the dynamic brake feed back signal and this voltage is differentiated by a capacitor 129 which charges via the emitter circuit of a grounded base transistor 130. The collector current of the transistor 130 is therefore proportional to the rate of change of the dynamic braking signal current and is fed to a non-linear load formed by the chain of diodes 131, 132, 133 and 134. The voltage developed across the load formed by these diodes is applied to the control winding 139 of a magnetic amplifier 135 via an emitter follower transistor 136. The output a.c. from the magnetic amplifier 135 is rectified by the rectifier bridge 137 and applied to the electropneumatic converter having control winding 124 referred to above. In this manner the output of the magnetic amplifier is added to the normal dynamic brake feed back signal which is applied to 124 via the Zener diode 118. The Zener diode 118 is included to ensure a working voltage for the transistors 130 and 136 at low signal levels.

Whilst the present invention has been described more specifically in relation to apparatus using digital coded inputs, the invention is in no way limited to the use of such a digital coded input. For example, the system may be a completely analogue system wherein the device 4 of FIG. 1 is replaced by an electropneumatic converter for converting an electrical analogue signal into a pneumatic signal for application to the blending valve 6.

Other variations, adaptations and modifications of the invention will be readily apparent to those skilled in the art.

Having thus described my invention what I claim is:

1. For a blending braking system having electric braking means and additional braking means, braking control apparatus including blending means responsive to a braking command signal and a signal indicative of electric braking for producing a control signal for the additional braking means for causing the additional braking means to make up for a deficiency between the electric braking and the braking called for by the command signal, and means responsive to a signal indicative of a changing electric braking effect for causing said control signal to change by an amount appropriate to a greater change of electric braking.

2. Braking control apparatus as claimed in claim 1, including means responsive to commencement of a said electric braking signal for driving a transistor circuit to switch to the blending means an output of a current amplifying current transformer to which said electric braking signal is applied and a time constant circuit which permits said current transformer output to be so switched for a limited time after which the proportionately lower value of the electric brake signal is switched to the blending means.

3. Braking control apparatus as claimed in claim 1, including means responsive to falling off in value of the electric braking signal for switching a shunt current path in parallel with the blending means to decrement the electric braking signal by a predetermined amount.

4. Braking control apparatus as claimed in claim 1, including circuit means responsive to the rate of change of the electric braking signal for producing an electric braking signal increment for addition to the electric braking signal as applied to the blending means.

* * * * *